Sept. 20, 1966 R. W. SIMPSON 3,273,895

ADAPTER SPINDLE FOR RECORD CHANGERS

Filed Nov. 22, 1963

3 Sheets-Sheet 1

INVENTOR.
RICHARD W. SIMPSON
BY Brown, Jackson,
Boettcher & Dienner
Attys

Sept. 20, 1966 R. W. SIMPSON 3,273,895

ADAPTER SPINDLE FOR RECORD CHANGERS

Filed Nov. 22, 1963 3 Sheets-Sheet 2

INVENTOR.
RICHARD W. SIMPSON
BY Brown, Jackson, Boettcher & Dienner
Attys.

ADAPTER SPINDLE FOR RECORD CHANGERS

Filed Nov. 22, 1963 3 Sheets-Sheet 3

INVENTOR.
RICHARD W. SIMPSON
BY Brown, Jackson, Boettcher & Dienner
ATTYS.

United States Patent Office 3,273,895
Patented Sept. 20, 1966

3,273,895
ADAPTER SPINDLE FOR RECORD CHANGERS
Richard W. Simpson, Stevensville, Mich., assignor to V-M Corporation, Benton Harbor, Mich., a corporation of Michigan
Filed Nov. 22, 1963, Ser. No. 325,690
18 Claims. (Cl. 274—10)

The present invention relates to an adapter spindle for record changers. More specifically, the invention relates to a large diameter adapter spindle designed to slip over a conventional small diameter center spindle of a record changer to adapt the latter for handling 45 r.p.m. records of the type having a large centerhole.

It is well known in the art to provide an adapter spindle having an outer diameter of approximately 1.5 inches which can be mounted over the conventional small diameter center spindle of a record changer to permit the latter to accommodate 45 r.p.m. records of the type having a large centerhole. Such known adapter spindles are generally fixedly associated with the small diameter center spindle so that both are stationary while the record changer turntable rotates during playing of a record. It is further known to provide such adapter spindles with record feeding mechanism which is actuated by a record ejector lever or the like embodied in the small diameter center spindle.

Referring more specifically to the adapters used heretofore, such adapters generally comprise a cylindrical housing member which houses a pair of oppositely disposed record support or shelf members and a pair of oppositely disposed record separator blades, the blades being positioned above the shelves for extension into the space between the lowermost and the next-to-lowermost records in a stack of records supported on the shelf members. In addition, various types of actuating mechanism are provided for retracting the shelves and extending the blades so as to permit the lowermost record to drop to a turntable. In some commonly used adapters the shelves and blades move linearly, while in others they pivot about respective fixed axes, but substantially all such structures embody relatively complex actuating mechanism for controlling the movement of the shelf and blade members. Accordingly, the adapter spindles heretofore known are relatively expensive to manufacture, and in addition the actuating mechanism occupies considerable space within the housing so as to require the use of the large diameter cylindrical housing mentioned above rather than a more compact structure.

Another disadvantage of adapter spindles of the type heretofore known relates to the means for centering records on the turntable. It will of course be understood that some means must be provided for centering a 45 r.p.m. record on the turntable for playing. In one known form of adapter spindle the stationary cylindrical adapter housing simply extends down substantially to the turntable whereby the lower end of the housing serves to center the records. In another type of known structure a cylindrical rotor member is carried at the lower end of the adapter housing and serves as a record centering member. Such a rotor member has the same cylindrical configuration and dimensions as the upper adapter housing except that it is mounted for rotation about the axis of the adapter spindle and is generally urged downwardly against the top of the turntable so as to be rotated thereby.

In adapter spindles having a rotor as described above, the main housing of the adapter is generally provided at its lower end with an axially disposed downwardly projecting cylindrical extension having a diameter of at least approximately 0.75 inch, and the rotor is provided with an internal tubular sleeve which fits over the extension so as to rotatably mount the rotor thereon. Reference may be had to Van Antwerp Patent 2,918,288, issued Dec. 22, 1959 and assigned to the assignee of the present invention, for a more complete description of a conventional adapter spindle of the type having a cylindrical rotor member at its lower end. The foregoing patent also illustrates a cylindrical adapter housing for housing a pair of oppositely disposed shelf members and a pair of oppositely disposed blade members as described hereinabove.

The foregoing known types of record centering means, while commonly used, are subject to certain significant disadvantages due to the configuration and mounting of the record centering member and the manner in which it operates to center records on the turntable. In the case where the stationary housing itself centers the records, the housing is cylindrical and is of a diameter only slightly less than the diameter of the large record centerhole, whereby as a record is rotated on the turntable there is sliding contact between the housing and the record around substantially the entire periphery of the record centerhole. With such an arrangement there is appreciable resistance to the rotary movement of the record, which in turn causes various inaccuracies commonly known as "wow" and "flutter" in the audio output of the record changer, and in addition causes wear of the record at its centerhole. The use of the cylindrical rotor substantially eliminates the sliding contact between the record and the adapter spindle and thus reduces wear on the record, but with this design there is an extensive bearing area or area of sliding contact between the rotor sleeve and the relatively large diameter tubular housing extension on which it is carried thus causing appreciable friction. In other words, the use of the large diameter rotor with its large bearing area leaves much to be desired relative to reduction of "wow" and "flutter," since the rotor still offers appreciable resistance to rotary movement of the record.

It is an object of the present invention to provide an improved adapter spindle which overcomes the above-mentioned disadvantages and which is unusually economical to manufacture.

A further object of the invention is to provide an adapter spindle having improved and vastly simplified record dropping means and mechanism for actuating the same.

Another of my objects is to provide an adapter spindle as last-above mentioned in combination with a compact housing so as to reduce the overall size of the adapter.

An additional object of the invention is to provide an adapter spindle having improved record centering means designed to appreciably reduce resistance to rotary movement of a record on the turntable.

In furtherance of the foregoing objects, I provide an adapter spindle having record feeding means comprising a single supporting shelf member and a single separator blade member, the blade being arranged above the shelf at one side of the housing. The blade member is positioned so as to be engaged and extended radially outwardly by the record ejector lever of the corresponding small diameter center spindle over which the adapter is mounted, and a bellcrank lever extending between the blade and the shelf causes the shelf to be retracted when the blade is extended. The simplicity of the foregoing record feeding means and actuating mechanism therefor permits the use of an unusually compact adapter housing, and in accordance with my invention such mechanism is mounted within a compact housing which is generally rectangular in its cross sectional configuration, at least at its upper end wherein such mechanism is contained, and if desired, throughout substantially its entire length.

In accordance with another of the important features of the present invention, record centering means is provided which comprises a plurality of small diameter offset rollers rotatably mounted at the lower end of the adapter spindle. Such rollers are of a diameter substantially less than the diameter of a record centerhole, and preferably even substantially less than one-half the diameter of a record centerhole, and the rollers are mounted in offset relation to the axis of the associated turntable so that the radially outermost roller surfaces engage spaced fragmentary portions of the periphery of the centerhole of a record disposed on the turntable for centering such a record thereon. The small diameter centering rollers are mounted by means of relatively small bearings so as to minimize the bearing area and thereby minimize friction. Consequently, resistance to rotary movement of a record on the turntable is substantially reduced so as to reduce "wow" and "flutter" and otherwise improve the performance of the associated record changer.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of my invention.

Figures 1, 2:
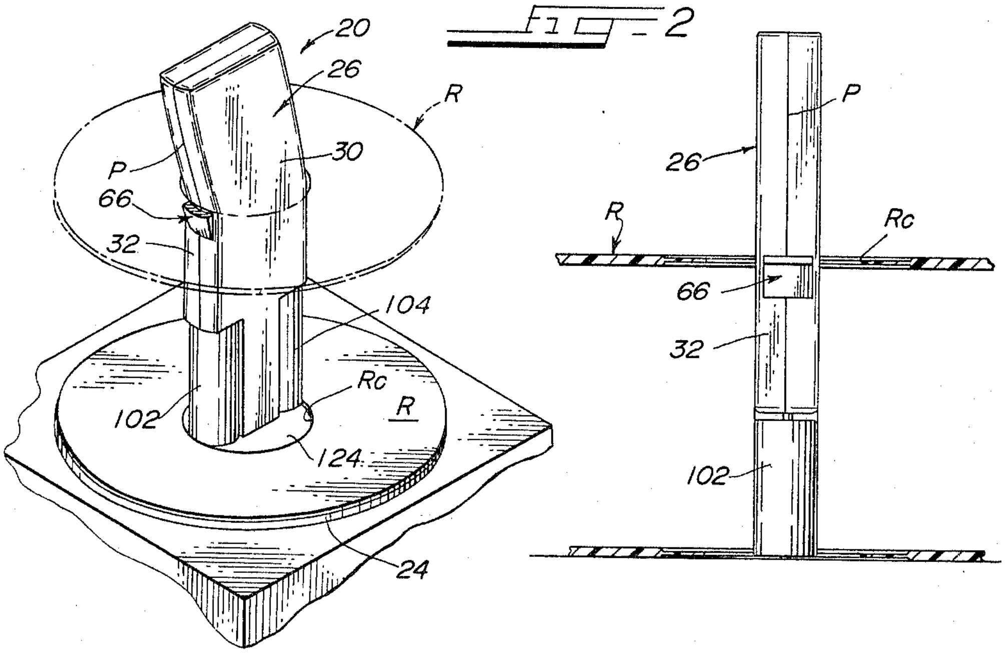
FIGURE 1 is a perspective view of an adapter spindle constructed in accordance with the principles of the present invention, the adapter spindle being shown mounted in operative position over the small diameter center spindle of a record changer.
FIGURE 2 is an elevational view of the adapter spindle of FIGURE 1.
Figure 3:
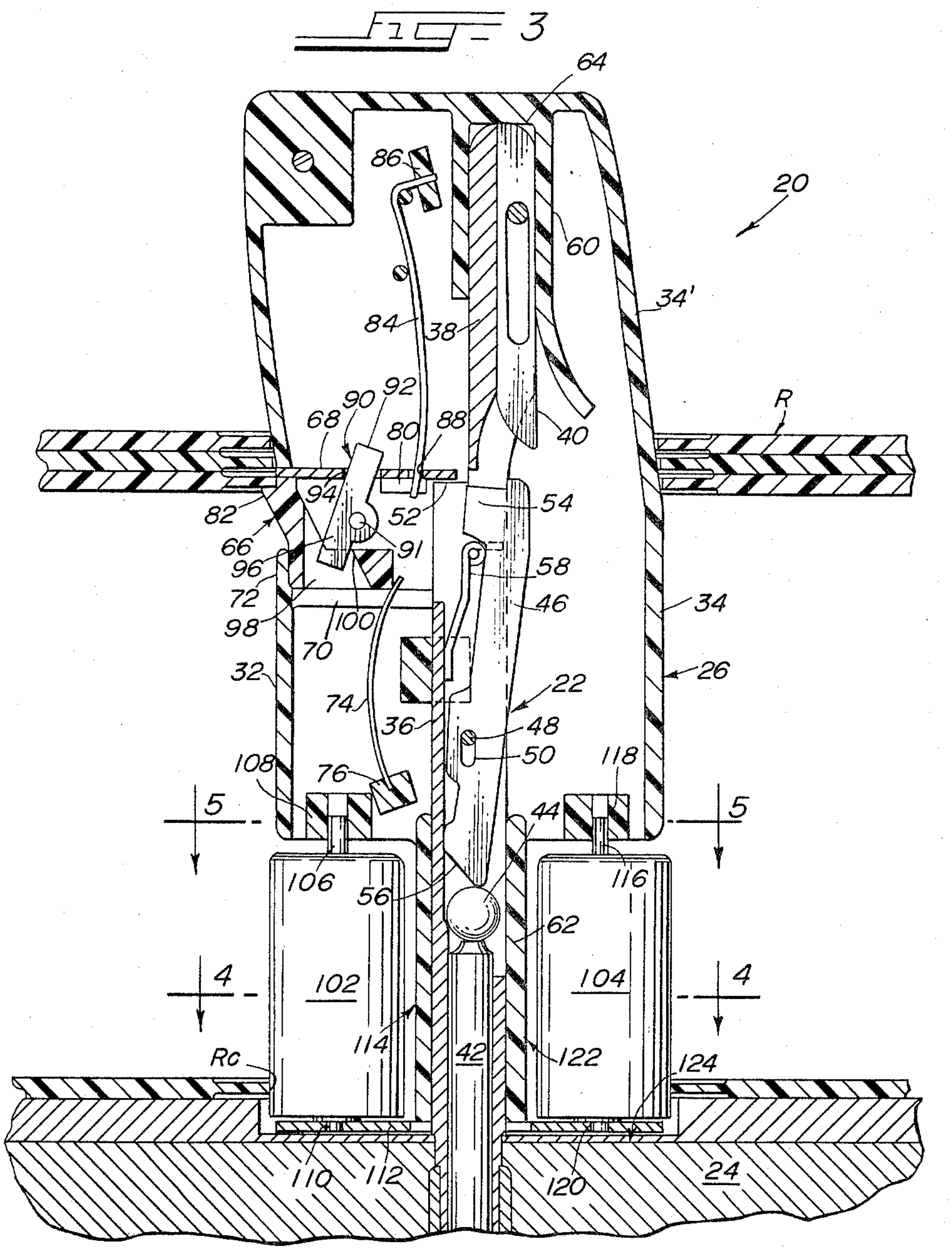
FIGURE 3 is an enlarged vertical section of the adapter spindle of FIGURE 1 showing the single shelf member in extended position so as to support a stack of records on the adapter, and showing a pair of oppositely disposed small diameter centering rollers mounted at the lower end of the spindle for centering records on the turntable for playing.

Referring now to the drawings, FIGURES 1–3 show an adapter spindle 20 mounted over a small diameter center spindle 22 of a record changer so as to support a stack of records R of the type having a large centerhole and for dropping such records one at a time to a turntable 24 for playing. The adapter spindle includes a housing 26 which is generally rectangular in its cross sectional configuration throughout substantially its entire length (see FIGURE 5) and comprises a pair of oppositely disposed side walls 28 and 30 and a pair of oppositely disposed end walls 32 and 34.

The adapter spindle 20 is mounted over the small diameter center spindle 22, the latter being conventional in the art and comprised of a main body portion 36, an upper offset portion 38, an upper slide 40, an axially movable actuator rod 42, a ball 44, and an ejector lever 46. The ejector lever 46 is pivotally mounted on a fixed cross pin 48 which projects through a short vertical slot 50 in the lever whereby the latter can pivot and also move vertically a limited amount. It will be understood that when the small diameter spindle 22 is used without the adapter 20, a stack of records of the type having a small centerhole are supported on an offset shoulder 52 and stabilized thereon by a conventional overlying record support arm (not shown). The ejector leve 46 is shown in FIGURE 3 in its normal lowered clockwise position, and in order to actuate the lever to push a record off the shoulder 52 the actuator rod 42 is moved upwardly. Upon upward movement of the rod 42, the ball 44 engages the lower end of lever 46 and moves the latter to its raised position wherein the upper end of a push off portion 54 on the lever is disposed above the shoulder 52, and as the ball is moved further upwardly it engages the inclined surface 56 at the lower end of the lever 46 and pivots the latter counterclockwise in such a manner that the push off portion 54 engages the periphery of the small centerhole of the lowermost record in the stack to push the latter off the shoulder 52 causing the record to drop to the turntable. The weight of the remainder of the stack returns the lever 46 to its lowermost position and a spring 58 returns the lever to its clockwise pivotal position. The foregoing small diameter center spindle is conventional in the art and is described herein to permit a fuller understanding of the operation of the adapter spindle 20 which is designed to slip over the small center spindle.

The adapter spindle housing 26 is provided with an internal sleeve 60 at its upper end which is designed to fit over the upper offset end 38 of the small center spindle 22, and the housing 26 is further provided with a lower internal sleeve or the like 62 which fits over the lower body portion 36 of the small spindle. In this manner the adapter spindle 20 can be mounted over the small center spindle 22 in a fixed position thereon. The vertical position of the adapter spindle may be determined by seating of the upper end of the offset portion 38 of the small center spindle against the base 64 of the upper interior sleeve 60 of the adapter spindle.

The adapter spindle 20 is provided with a record supporting shelf or bolt 66 and a record separating blade 68, and an opening is provided in the housing end wall 32 so as to permit each of the foregoing components to be moved between an extended position wherein it projects outwardly beyond the housing and a retracted position wherein it is disposed within the confines of the housing. The shelf 66 is mounted on a horizontal supporting wall portion 70 of the adapter housing 26 so as to be slidable between a radially outer extended position and a radially inner retracted position, the radially outer position being determined by a generally vertical housing wall portion 72 which limits the outward movement of the shelf. The shelf 66 may be dimensioned so as to fit between and be guided in its linear sliding movement by the housing side walls 28 and 30. A leaf spring 74 has one end fixedly secured to the housing at 76 and its free end extends upwardly so as to engage the radially inner side of the shelf and bias the latter toward its radially outer extended position as shown in FIGURE 3.

The record separator blade 68 is mounted on a horizontal housing wall portion 80 for linear sliding movement between a radially outer extended position and a radially inner retracted position, and the blade may be dimensioned so as to fit between and be guided in such movement by the housing side walls 28 and 30. The blade 68 is spaced above a record supporting portion 82 on the shelf 66 by a distance slightly greater than the thickness of a record R so that when the blade is extended it will project into the space between the lowermost and the next-to-lowermost records in a stack of records R supported on the shelf. A leaf spring 84 has one end fixedly secured to the housing at 86 and its free end extends downwardly through an opening 88 in the blade 68 so as to engage the blade and bias the same toward its radially inner retracted position as shown in FIGURE 3.

Figure 6:
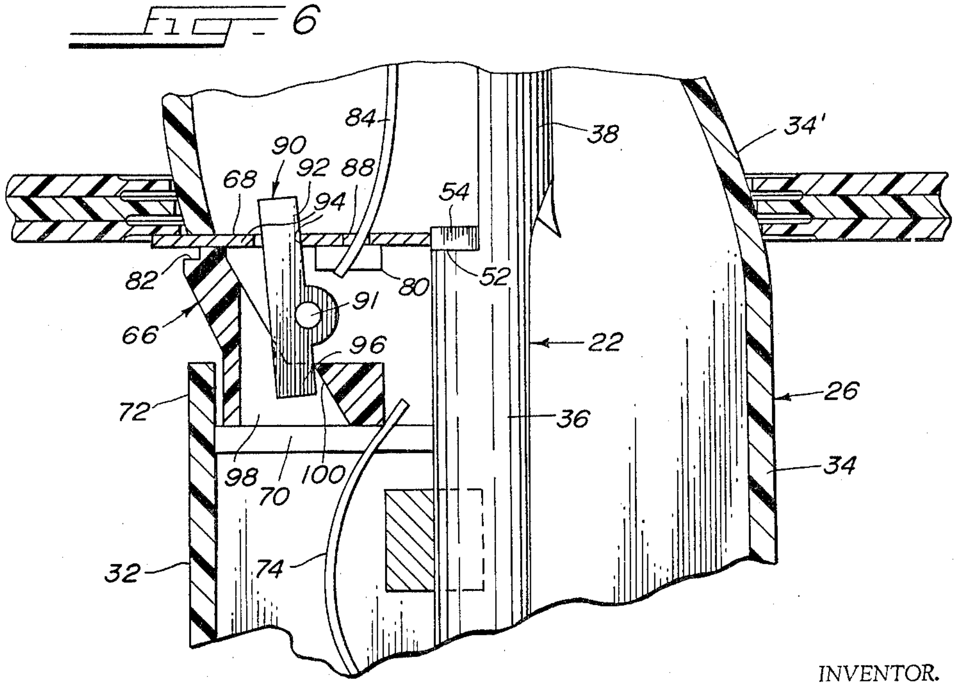
FIGURE 6 is a fragmentary vertical section, taken on a substantially enlarged scale, showing the single shelf and separator blade embodied in the adapter spindle for supporting a stack of records and dropping them one at a time to the turntable for playing, the blade being shown in its extended operative position and the shelf being shown in its retracted inoperative position.

A bellcrank lever 90 is pivotally mounted on a horizontal pin 91 which is fixed relative to the housing 26, and the lever serves to provide a connection between the separator blade 68 and the shelf 66. That is, the bellcrank lever 90 comprises a first arm 92 which extends generally upwardly so as to project through an aperture 94 formed in the blade 68, and the lever further comprises a downwardly projecting arm 96 which projects down into a pocket or recess 98 formed in the shelf 66 so as to engage against a rear wall 100 thereof. It will thus be understood that when the blade 68 is extended to the position shown in FIGURE 6, the bellcrank lever 90 will be rotated in a counterclockwise direction and the lower arm 96 will move the shelf 66 to its radially retracted position.

Reviewing briefly the operation of the record dropping components of the adapter spindle 20, the record supporting shelf 66 and separator blade 68 are normally in the positions shown in FIGURE 3, and a stack of records R of the type having a large centerhole are mounted over the upper end of the adapted housing 26 so as to be supported on the radially extending shelf portion 82. It will be seen from FIGURES 3 and 6 that the lower end of the adapter housing 26 is approximately vertical, whereas the upper end, i.e. the portion disposed above the shelf 66, is inclined upwardly and to the left. This inclination can be varied somewhat, but an angle of inclination can be varied somewhat, but an angle of inclination to the vertical of approximately 5 degrees has been found satisfactory for the intended purpose which is to assist in maintaining the records disposed on the shelf 66 in a level condition. That is, because only one shelf and one separator blade are utilized, and thus there are no record supporting components on the opposite side 34 of the spindle, there would be a tendency for the stack of records to droop downwardly on the side opposite the shelf 66. However, the offsetting of the upper end of the adapter housing, whereby the upper housing wall 34′ defines an angle of approximately 5 degrees relative to the lower housing wall 34, is effective in maintaining the records in a level condition. In addition, it is important to note that the adapter spindle of the present invention is preferably used in conjunction with the usual overlying record support arm as is conventionally used when the small diameter center spindle 22 is utilized without the adapter.

When a record R is to be dropped to the turntable, the actuator rod 42 is moved upwardly so as to move the ejector lever 46 of the small center spindle first upwardly and then in a counterclockwise direction in the manner described earlier herein. Consequently, the push off portion 54 on the ejector lever 46 engages the radially inner edge of the separator blade 68 and moves the latter to its radially extended position of FIGURE 6 wherein the blade supports all but the lowermost record of the stack. As the blade 68 is thus extended, the bellcrank lever 90 is pivoted counterclockwise so as to retract the supporting shelf 66, thereby permitting the lowermost record R to fall to the turntable 24 for playing. When the actuator rod 42 is lowered, the ejector lever 46, the shelf 66 and the blade 68 are all returned to the positions of FIGURE 3, whereby the stack of records R is again supported on the record supporting shelf 66. It should be understood of course that the spring 84 must be of sufficient strength that it will retract the blade 68 even though the latter is at the time loaded by a full stack of records. It should be further understood that when the foregoing components are in the positions of FIGURE 3, the shelf 66 is adapted to be cammed radially inwardly so as to permit records to be removed from the turntable and upwardly off the adapter spindle without removing the adapter spindle itself from its operative position. In other words the record will engage the inclined outer surface of the shelf 66 and cam the latter inwardly against the force of the spring member 74.

Figure 5:
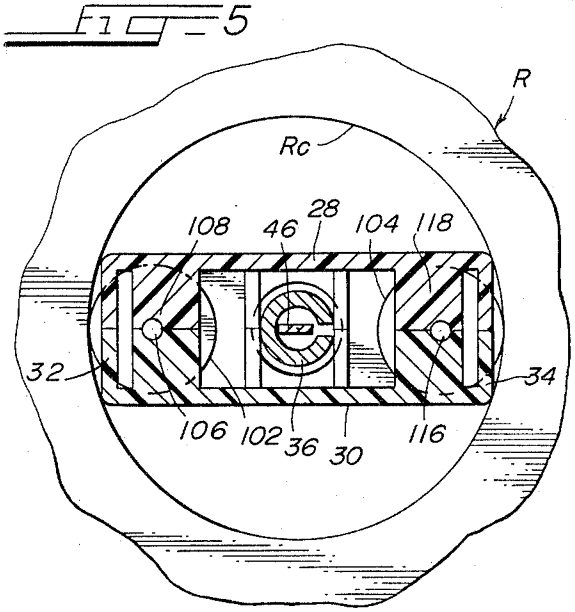
FIGURE 5 is a horizontal section, partly broken away, taken substantially along the line 5—5 of FIGURE 3.

It is important to note that the unusually simplified record feeding mechanism as described hereinabove occupies relatively little space and can thus be housed within the compact housing 26 which is generally rectangular in its cross sectional configuration as best shown in FIGURES 1, 2 and 5, and which is substantially smaller in overall size than the cylindrical adapter housings commonly used heretofore. It should also be noted that the housing 26 can be made in two half sections which meet along a vertical parting line indicated at P in FIGURES 1 and 2, and thus the two housing sections can be provided with interlocking portions which permit them to be snapped together, or if desired they can be secured together by screws or other suitable fastening means.

In order to center a record R on the turntable 24 for playing, there is provided a pair of oppositely disposed small diameter centering rollers 102 and 104 which are mounted at the lower end of the adapter spindle for rotation about vertical axes. The roller 102 is fixedly associated with a small diameter axial pin 106 which extends outwardly from opposite ends of the roller. The upper end of the pin 106 is journaled in a bearing 108 which comprises a part of the adapter housing 26, and the lower end of the pin is journaled in a bearing 110 formed in a bottom plate 112 which is secured in any suitable fashion to the underside of the adapter spindle. The lower end of the adapter housing 26 has a recess or well 114 formed therein in which the roller 102 is vertically disposed. In a similar fashion, the roller 104 is carried on an axial pin 116 the upper end of which journaled in a bearing 118 which comprises a part of the adadapter housing 26, and the lower end of the pin is journaled in a bearing 120 formed in the bottom plate 112. The lower end of the adapter housing 26 is provided with a second recess or well 122 in which the roller 104 is vertically disposed.

As best shown in FIGURE 3, the turntable 24 is provided with a central depressed well portion 124 which is of circular configuration, and the lower end of the adapter spindle 20 extends down into the well 124 so as to project downwardly through the centerhole of a record on the turntable. While a relatively deep well 124 is shown in the drawing for purposes of illustration, it will be understood that it may be relatively shallow, the important criteria being that the lower ends of the rollers 102 and 104 must extend downwardly into the centerhole of a record on the turntable 24 so as to engage against the periphery $R_c$ of the record centerhole. It is also desirable that the bottom plate 112 of the adapter not engage against the base of the well 124 so as to avoid friction between the adapter spindle and the turntable as the latter rotates.

Figure 4:
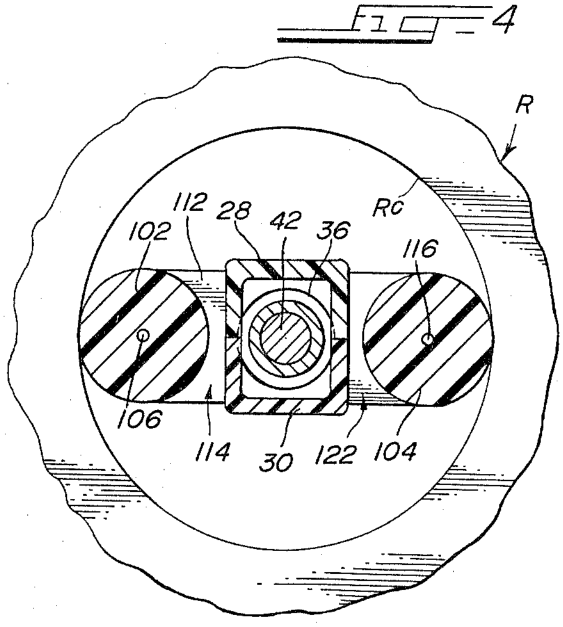
FIGURE 4 is a horizontal section, partly broken away, taken substantially along the line 4—4 of FIGURE 3, illustrating in particular the manner in which the pair of oppositely disposed offset centering rollers function to center a record on the turntable.

Referring to FIGURES 1, 3 and 4, it is important to note that no portion of the adapter housing 26 engages a record R disposed on the turntable 24. That is, the lower end of the housing 26 is recessed so that the housing is disposed radially inwardly of the entire periphery $R_c$ of a record on the turtable, whereby the record is centered solely through engagement by the pair of oppositely disposed centering rollers 102 and 104. The rollers 102 and 104 are preferbaly of a diameter less than one-half the diameter of the centerhole in a record R of the type having a large centerhole, and each of the rollers is disposed so that the radially outermost surface thereof is spaced from the central axis of the turntable 24 by a distance equal to one-half the diameter of the record centerhole. Consequently, as best shown in FIGURE 4, the radially outermost surfaces of the oppositely disposed rollers 102 and 104 will engage oppositely disposed fragmentary portions of the periphery $R_c$ of the record centerhole so as to maintain such a record in a centered position on the turntable. The rollers each engage such periphery aprroximately along the line the lengh of which is equal to the thickness of the central portion of the record.

While I have illustrated by invention in certain preferred forms, I do not intend to be limited to such forms, except insofar as the appended claims are so limited, since modifications coming within the scope of my invention will be readily suggested to others with my disclosure before them.

I claim:

1. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter housing having an aperture in one side thereof, record feeding means mounted in said housing and movable horizontally so as to project outwardly of said housing through said aperture, said horizontally movable record feeding means consisting of a single record supporting shelf member and a single separator blade member disposed above said shelf, said shelf being slidably mounted in said housing for movement between a normal extended operative position wherein it is adapted to support a stack of records on said adapter spindle and a retracted inoperative position, said separator blade being slidably mounted in said housing above said shelf for movement between a normal retracted inoperative position and an extended position wherein it is adapted to project between the lowermost and the next-to-lowermost records in a stack of records supported on said adapter spindle, said blade being positioned in the path of movement of said ejecting means of said small diameter spindle so as to be engageable and movable thereby to its extended position, and reverse motion translating means interconnecting said blade and said shelf for moving said shelf to its retracted position when said blade is moved by said ejecting means to its extended position.

2. In an adapter spindle of the type designed to slip over a small diameter center spindle of a record changer for supporting a stack of large center hole records and for dropping such records one at a time to a turntable for playing, which small diameter center spindle is of the type having records ejecting means embodied therein, the improvement comprising, in combination, an adapter housing having an aperture in one side thereof, record feeding means mounted in said housing and movable horizontally so as to project outwardly of said housing through said aperture, said horizontally movable record feeding means consisting of a single record supporting shelf member and a single separator blade member disposed above said shelf, said shelf being slidably mounted in said housing for movement between a normal extended operative position wherein it is adapted to support a stack of records on said adapter spindle and a retracted inoperative position, said separator blade being slidably mounted in said housing above said shelf for movement between a normal retracted inoperative position and an extended position wherein it is adapted to project between the lowermost and the next-to-lowermost records in a stack of records supported on said adapter spindle, said blade being positioned in the path of movement of said ejecting means of said small diameter spindle so as to be engageable and movable thereby to its extended position, and mean mounted for pivotal movement about a horizontal axis interconnecting said blade and said shelf for moving said shelf to its retracted position when said blade is moved by said ejecting means to its extended position.

3. In an adapter spindle of the type designed to slip over a small diameter center spindle of a record changer for supporting a stack of large center hole records and for dropping such records one at a time to a turntable for playing, which small diameter center spindle is of the type having record ejecting means embodied therein, the improvement comprising, in combination, an adapter housing having an aperture in one side thereof, record feeding means mounted in said housing and movable horizontally so as to project outwardly through said aperture, said horizontally movable record feeding means consisting of a single record supporting shelf member and a single separator blade member disposed above said shelf, said shelf being mounted in said housing for linear sliding movement between a normal extended operative position wherein it is adapted to support a stack of records on said adapter spindle and retracted inoperative position, said separator blade being mounted in said housing above said shelf for linear sliding movement between a normal retracted inoperative position and an extended position wherein it is adapted to project between the lowermost and the next-to-lowermost records in a stack of records supported on said adapter spindle, said blade being positioned in the path of said movement of said ejecting means of said small diameter spindle so as to be engageable and movable thereby to its extended position, and means interconnecting said blade and said shelf for moving said shelf to its retracted position when said blade is moved by said ejecting means to its extended position.

4. The invention of claim 1 wherein first spring means is provided for biasing said record supporting shelf member toward its extended operative position and second spring means is provided for biasing said separator blade member towards its retracted position.

5. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter housing having an aperture in one side thereof, record feeding means mounted in said housing and movable horizontally so as to project outwardly of said housing through said aperture, said horizontally movable record feeding means consisting of a single record supporting shelf member and a single separator blade member disposed above said shelf, said shelf being slidably mounted in said housing for movement between a normal extended operative position wherein it is adapted to support a stack of records on said adapter spindle and a retracted inoperative position, said separator blade being slidably mounted in said housing above said shelf for movement between a normal retracted inoperative position and an extended position wherein it is adapted to project between the lowermost and the next-to-lowermost records in a stack of records supported on said adapter spindle, said blade being positioned in the path of movement of said ejecting means of said small diameter spindle so as to be engageable and movable thereby to its extended position, and a bellcrank lever mounted for pivotal movement about a horizontal axis and having a first arm associated with said blade member and a second arm associated with said shelf member for interconnecting said blade and shelf and for moving said shelf to its retracted position when said blade is moved by said ejecting means to its extended position.

6. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, a relatively compact adapter housing which is generally rectangular in its transverse cross sectional configuration at least at the upper portion thereof, said upper rectangular portion of said housing having an aperture in one side thereof, record feeding means mounted in said housing and movable horizontally so as to project outwardly of said housing though said aperture, said horizontally movable record feeding means consisting of a single record supporting shelf member and a single separator blade member disposed above said shelf, said shelf being slidably mounted in said housing for movement between a normal extended operative position wherein it is adapted to support a stack of records on said adapter spindle and a retracted inoperative position, said separator blade being slidably mounted in said housing above said shelf for movement between a normal retracted inoperative position and an extended position wherein it is adapted to project between the lowermost and the next-to-lowermost records in a stack of records supported on said adapter spindle, said blade being positioned in the path of movement of said ejecting means of said small diameter spindle so as to be engageable and movable thereby to its extended position, and reverse motion translating means responsive to movement of said blade to its extended position for moving said shelf to its retracted position.

7. The invention of claim 6 wherein said compact housing is generally rectangular in its cross sectional configuration throughout substantially its entire length.

8. In an adapter spindle of the type designed to slip over a small diameter center spindle of a record changer for supporting a stack of large center hole records and for dropping such records one at a time to a turntable for playing, which small diameter center spindle is of the type having record ejecting means embodied therein, the improvement comprising, in combination, a relatively compact adapter housing which is generally rectangular in its cross sectional configuration at least at the upper portion thereof, said supper rectangular portion of said housing having an aperture in one side thereof, record feeding means mounted in said housing and movable horizontally so as to project outwardly of said housing through said aperture, said horizontally movable record feeding means consisting of a single record supporting shelf member and a single separator blade member disposed above said shelf, said shelf being slidably mounted in said housing for movement between a normal extended operative position wherein it is adapted to support a stack of records on said adapter spindle and a retracted inoperative position, said separator blade being slidably mounted in said housing above said shelf for movement between a normal retracted inoperative position and an extended position wherein it is adapted to project between the lowermost and the next-to-lowermost records in a stack of records supported on said adapter spindle, said blade being positioned in the path of movement of said ejecting means of said small diameter spindle so as to be engageable and movable thereby to its extended position, and means mounted for pivotal movement about a horizontal axis and interconnecting said blade and said shelf for moving said shelf to its retracted position when said blade is moved by said ejecting means to its extended position.

9. In an adapter spindle of the type designed to slip over a small diameter center spindle of a record changer for supporting a stack of large centerhole records and for dropping such records one at a time to a turntable for playing, which small diameter center spindle is of the type having record ejecting means emodied therein, the improvement comprising, in combination, a relatively compact adapter housing which is generally rectangular in its cross sectional configuration at least at the upper portion thereof, said upper rectangular portion of said housing having an aperture in one side thereof, record feeding means mounted in said housing and movable horizontally so as to project outwardly of said housing through said aperture, said horizontally movable record feeding means consisting of a single record supporting shelf member and a single separator blade member disposed above said shelf, said shelf being mounted in said housing for linear sliding movement between a normal extended operative position wherein it is adapted to support a stack of records on said adapter spindle and a retracted inoperative position, said separator blade being mounted in said housing above said shelf for linear sliding movement between a normal retracted inoperative position and an extended position wherein it is adapted to project between the lowermost and the next-to-lowermost records in a stack of records supported on said adapter spindle, said blade being positioned in the path of movement of said ejecting means of said small diameter spindle so as to be engageable and movable thereby to its extended position, and a bellcrank lever mounted for pivotal movement about a horizontal axis and having a first arm associated with said blade member and a second arm associated with said shelf member for interconnecting said blade and shelf and for moving said shelf to its retracted position when said blade is moved by said ejecting means to its extended position.

10. The invention of claim 9 wherein said compact housing is generally rectangular in its cross sectional configuration throughout substantially its entire length.

11. The invention of claim 9 wherein first spring means is provided for biasing said record supporting shelf member toward its extended operative position and second spring means is provided for biasing said separator blade member toward its retracted position.

12. The invention of claim 9 wherein the upper end of said housing above said record supporting shelf member is inclined so as to extend upwardly and toward the side of said housing having said aperture therein.

13. In an adapter spindle of the type designed to slip over a small diameter center spindle of a record changer for dropping large centerhole records one at a time to a turntable and for centering such records on the turntable for playing, the improvement comprising, in combination, an adapter spindle housing dimensioned at its lower end so as to be spaced from the entire periphery of the centerhole of a record which is centered on the turntable, and record centering means for centering a record on the turntable, said record centering means comprising a plurality of spaced apart centering rollers rotatably mounted on the adapter spindle and each positioned so that when in use a radially outermost vertical roller surface is spaced from the central axis of the turntable by a distance equal to one-half the diameter of the record centerhole, and each of said rollers being of a diameter less than one-half the diameter of said centerhole and being positioned eccentrically relative to the turntable so as to extend downwardly into the centerhole of a record on the turntable with the respective radially outermost roller surfaces in engagement with corresponding spaced fragmentary portions of the periphery of the centerhole of the record and thereby center the record on the turntable.

14. In an adapter spindle of the type designed to slip over a small diameter center spindle of a record changer for dropping large centerhole records one at a time to a turntable and for centering such records on the turntable for playing, the improvement comprising, in combination, and adapter spindle housing dimensioned at its lower end so as to be spaced from the entire periphery of the centerhole of a record which is centered on the turntable, and record centering means for centering a record on the turntable, said record centering means comprising a plurality of spaced apart cylindrical centering rollers mounted on the adapter spindle for rotation about respective vertical axes and each positioned so that when in use a radially outermost vertical roller surface is spaced from the central axis of the turntable by a distance equal to one-half the diameter of the record centerhole, and each of said rollers being of a diameter substantially less than one-half the diameter of said centerhole and being positioned eccentrically relative to the turntable so as to extend downwardly into the centerhole of a record on the turntable with the respective radially outermost roller surfaces in engagement with corresponding spaced fragmentary portions of the periphery of the centerhole of the record and thereby center the record on the turntable.

15. The invention of claim 14 wherein each of said cylindrical centering rollers is rotatably mounted by means of a small diameter axial pin which extends outwardly from each end thereof and is journaled in bearing means provided on the adapter spindle.

16. The invention of claim 14 wherein said cylindrical centering rollers consist of a pair of oppositely disposed rollers.

17. In an adapter spindle of the type designed to slip over a small diameter center spindle of a record changer for dropping large centerhole records one at a time to a turntable and for centering such records on the turntable for playing, the improvement comprising, in combination, a relatively compact adapter housing which is generally rectangular in its cross sectional configuration throughout substantially its entire length, said housing being dimensioned at its lower end so as to be spaced from the entire periphery of the centerhole of a record which is centered on the turntable, and record centering means for centering a record on the turntable, said record centering means consisting of a pair of oppositely disposed spaced apart cylindrical centering rollers mounted on the adapter spindle for rotation about respective vertical axes and each positioned so that when in use a radially outermost vertical roller surface is spaced from the central axis of the turntable by a distance equal to one-half the diameter of the record centerhole, and each of said rollers being of a diameter substantially less than one-half the diameter of said centerhole and being positioned eccentrically relative to the turntable so as to extend downwardly into the centerhole of a record on the turntable with the respective radially outermost roller surfaces in engagement with corresponding oppositely disposed fragmentary portions of the periphery of the centerhole of the record and thereby center the record on the turntable.

18. In an adapter spindle of the type designed to slip over a small diameter center spindle of a record changer for dropping large centerhole records one at a time to a turntable and for centering such records on the turntable for playing, which small diameter center spindle is of the type having record ejecting means embodied therein, the improvement comprising, in combination, a relatively compact adapter housing which is generally rectangular in its cross sectional configuration throughout substantially its entire length, said housing having an aperture in one side thereof and being dimensioned at its lower end so as to be spaced from the entire periphery of the centerhole of a record which is centered on the turntable, record feeding means mounted in said housing and movable horizontally so as to project outwardly of said housing through said aperture, said horizontally movable record feeding means consisting of a single record supporting shelf member and a single separator blade member disposed above said shelf, said shelf being slidably mounted in said housing for movement between a normal extended operative position wherein it is adapted to support a stack of records on said adapter spindle and a retracted inoperative position, said separator blade being slidably mounted in said housing above said shelf for movement between a normal retracted inoperative position and an extended position wherein it is adapted to project between the lowermost and the next-to-lowermost records in a stack of records supporting on said adapter spindle, said blade being positioned in the path of movement of said ejecting means of said small diameter spindle so as to be engageable and movable thereby to its extended position, a bellcrank lever mounted for pivotal movement about a horizontal axis and having a first arm associated with said blade member and a second arm associated with said shelf member for interconnecting said blade and shelf and for moving said shelf to its retracted position when said blade is moved by said ejecting means to its extended position, and record centering means for centering a record on the turntable, said record centering means consisting of a pair of oppositely disposed spaced apart cylindrical centering rollers mounted on the adapter spindle for rotation about respective vertical axes and each positioned so that when in use a radially outermost vertical roller surface is spaced from the central axis of the turntable by a distance equal to one-half the diameter of the record centerhole, and each of said rollers being of a diameter substantially less than one-half the diameter of said centerhole and being positioned eccentrically relative to the turntable so as to extend downwardly into the centerhole of a record on the turntable with the respective radially outermost roller surfaces in engagement with corresponding oppositely disposed fragmentary portions of the periphery of the centerhole of the record and thereby center the record on the turntable.

References Cited by the Examiner

UNITED STATES PATENTS

| | | | |
|---|---|---|---|
| 2,666,648 | 1/1954 | Dole | 274—105 |
| 3,094,332 | 6/1963 | Vistain | 274—105 |

NORTON ANSHER, *Primary Examiner.*

W. E. JACKSON, *Assistant Examiner.*